3,493,743
METHOD OF MEASURING OXYGEN CONTAMINATION OF LIQUID SODIUM
Leonard Newman, Smithtown, N.Y., assignor to the United States of America as represented by the United States Atomic Energy Commission
No Drawing. Filed Mar. 6, 1968, Ser. No. 710,769
Int. Cl. B01d 59/44
U.S. Cl. 250—41.9         4 Claims

ABSTRACT OF THE DISCLOSURE

A method of measuring oxygen contamination of sodium by adding a known amount of $Ag_2O^{18}$ to a given amount of sodium and thereafter measuring the ratio of $O^{18}$ to $O^{16}$ in a mass spectrometer. This is accomplished by adding C to produce CO and analyzing the resulting CO for the $O^{18}$ to $O^{16}$ ratio.

BACKGROUND OF THE INVENTION

In sodium-cooled nuclear reactors the presence of small amounts of oxygen is a controlling factor in corrosion and mass transfer which affect the life and safety of the reactor. Certain materials considered to be otherwise quite suitable for specific applications in a nuclear reactor, as, for example, columbium, are readily oxidized by the oxygen in solution, even in very small amounts such as a few p.p.m. of the oxygen.

While considerable precautions are generally taken to insure that the presence of oxygen will be kept to the barest possible minimum, it is quite apparent that during normal operation of the reactor, regular tests for the presence of oxygen should be made to insure that the level of oxygen will not increase unexpectedly to unsafe values. Furthermore, a sudden, though slight, increase in oxygen might be the first detectable indication of a failure or otherwise undetected deviation from normal operation.

As a result of such need, a variety of techniques and devices have been developed over the years to measure the amount of oxygen dissolved in liquid sodium. The use of a bypass stream to be cooled to precipitate out the sodium oxide is one such device but its sensitivity frequently does not go below 75 p.p.m. and other impurities tend to interfere with the results of this method. Other techniques have been tried with uneven success due to inconsistent results or technical requirements which are difficult to meet or maintain under ordinary operation conditions. An important disadvantage of most currently used techniques for measuring the oxygen in sodium is their lack of specificity, that is, the oxygen is not directly identified, but is indirectly measured by other methods which attempt to eliminate other possible ingredients, thereby increasing the chances of error. In addition, there is no practical method capable of producing measurements of oxygen down to under 5 p.p.m.

SUMMARY OF THE INVENTION

This invention was made in the course of, or under a contract with the United States Atomic Energy Commission.

The present invention overcomes many of the difficulties associated with previous ways of measuring the normal oxygen present in liquid sodium and additionally makes it possible to measure the oxygen present down to less than 5 p.p.m.

The mean atomic mass of normal oxygen as it appears in nature and as measured by spectographic analysis is 16.0045. This figure is based upon the fact that oxygen has three stable isotopes, $O^{16}$, $O^{17}$, and $O^{18}$, whose relative abundances are 99.759%, 0.036%, and 0.204%, respectively, based upon $O^{16}$ assigned an atomic mass of 16.0000. This invention utilizes those facts in what can be referred to as an isotope dilution method to determine the amount of normal oxygen present in sodium. By normal oxygen is meant oxygen comprising its stable isotopes in the proportions described above. In view of the preponderance of $O^{16}$ any foreseeable deviation will not affect significantly the results obtained by this invention.

In accordance with this invention, an isotope of oxygen other than $O^{16}$ is added to a sample of the sodium and thereafter the ratio of the $O^{18}$ to $O^{16}$ is measured in a mass spectrometer. With the amount of $O^{18}$ added known to a high degree of accuracy, it is possible to take advantage of the known highly accurate results which can be obtained in a mass spectrometer to determine how much normal O is present. In view of the greater occurrence of $O^{18}$ as compared to $O^{17}$, it is found to be feasible to utilize $O^{18}$ as the oxygen isotope to be added.

It is therefore a principal object of this invention to measure oxygen contamination of sodium by diluting the oxygen with a less abundant isotope of oxygen and measuring accurately the mass ratio of the most abundant and less abundant isotopes.

Other objects and advantages of this invention will hereinafter become readily apparent from the following description of a preferred embodiment.

DESCRIPTION OF THE PREFERRED EMBODIMENT

In accordance with this invention a known amount of a compound of $O^{18}$ such as $Ag_2O^{18}$ which will oxidize the sodium is added to the sodium whose normal oxygen content is to be measured, and is allowed to equilibrate with the $Na_2O$ already present. The mixture is then treated to a temperature sufficient to remove sodium by distillation. After removal of the sodium, the residue consists largely of $Na_2O$ and Ag. Graphite powder as a source of carbon is added and the mixture is heated to greater than 500° C. where the oxygen present is converted to CO by the net reaction $Na_2O + C \rightarrow CO + 2$ Na. Because of the relatively small amounts of the reactants involved any significant addition of C results in an excess of the latter so that the reaction proceeds to CO rather than $CO_2$. By operating the process to produce CO rather than $CO_2$ it is not necessary to provide a specific amount of C thereby eliminating a possible source of errors.

A sample of the CO effluent is then examined in a mass spectrometer as is understood in the art and the mass ratio $CO^{18}/CO^{16}$ determined. Knowing exactly how much $Ag_2O^{18}$ was added initially, how much sodium was present initially, and permitting the reactants to equilibrate, this ratio indicates directly how much O was present in the sodium sample. Expected and normal variation of relative abundances of the stable isotopes present in the oxygen whose presence is to be determined is insufficient to alter the accuracy of the process to any significant extent.

The process as just described theoretically will produce the most accurate results when the mass $O^{18}$ added it matched to the mass of the normal oxygen present in the sodium sample. It has been found, however, that accuracy is at a reasonable value if the added $O^{18}$ is in the range between one-half and double that of the normal oxygen present in the sample. Thus, in the even that the amount of normal oxygen present is not indicated by previous tests (i.e., in a program to monitor a sodium loop) it may be necessary to repeat the tests until the results level off or close in on the actual value.

A critical step in the carrying out of this invention is that of carrying away the sodium vapors produced in the distillation step. If this step is not carried out rapidly, that is, if the sodium vapor is not carried away at a sufficient rate, the reaction will tend to reverse itself. This is accomplished, as is understood in the art, by condensing out the sodium vapor on a cold surface or finger.

An important practical aspect of this invention is the necessity to utilize a compound of $O^{18}$ having a relatively large atomic mass in order to make it feasible to weigh out the oxide to obtain the desired mass weight of $O^{18}$ with a relatively good degree of accuracy. Hence, silver oxide is suitable because of the high atomic mass of silver. In addition, it has been found that HgO may be utilized to carry out this invention. In this way, the process of this invention is not merely theoretically possible but capable of being used routinely with excellent results.

The following examples illustrate this invention.

EXAMPLE I

A 1 gm. sample of sodium containing some normal oxygen was placed in a molybdenum crucible. About 0.2 mg. of $Ag_2O^{18}$ powder was added and then heated to 300° to 500° C. at which time the sodium was distilled off rapidly. Graphite powder, outgassed at 2000° C., was added to the crucible and the contents of the crucible were heated to greater than 500° C. The gaseous product CO liberated was collected and examined in a mass spectrometer for $CO^{18}/CO^{16}$ and the results indicated normal oxygen content of the original sample to be 10 p.p.m.

EXAMPLE II

The previous experiment with a different sample of sodium was repeated utilizing $HgO^{18}$ instead of $Ag_2O^{18}$, with 0.2 mg. of the former added to the 1 gm. sample of Na. It was found that the normal oxygen content of the original sample was about 20 p.p.m.

In both examples the results compared closely with the amounts of oxygen present in the original samples.

It is thus seen that there has been provided a unique method of measuring the oxygen contamination of sodium with a degree of specificity, accuracy, and sensitivity heretofore not considered to be attainable.

An important advantage of this invention is that while very small amounts of oxygen are being measured accuracy is made feasible by utilizing substantial weights of the reactants (i.e. the $Ag_2O^{18}$) which can be supplied with relative accuracy and the amount of C supplied is not critical. In this way the process of this invention is capable of great accuracy without being subject to excessively stringent operating requirements.

While only preferred embodiments of the invention have been described, it is understood that the invention is to be defined only by the scope of the appended claims.

What is claimed is:
1. The method of measuring the content of normal oxygen in liquid sodium comprising the steps of:
    (a) isolating a sample of a known mass of said sodium;
    (b) reducing in said sample a known mass of a metal oxide selected from the group consisting of $Ag_2O^{18}$ and $HgO^{18}$;
    (c) removing by distillation substantially all of the unbonded sodium present with sufficient rapidity to prevent reversal of the reducing step, leaving a sodium residue consisting substantially all of $Na_2O$ where O is a mixture of normal oxygen from said sample and $O^{18}$ from said metal oxide;
    (d) adding carbon to said sodium residue to oxidize said carbon and removing CO as produced; and
    (e) measuring mass spectrometrically the ratio of $CO^{18}/CO^{16}$ for determining the percent of normal oxygen present in said sample.

2. The method of claim 1 in which the reducing step takes place at a temperature within the range of 300 to 500° C.

3. The method of claim 2 in which the carbon is oxidized in said residue at a temperature of about 500° C.

4. The method of claim 3 in which the metal oxide added is in such amount that the $O^{18}$ is in the range of between one-half and double that of the normal oxygen present in the sample.

References Cited

UNITED STATES PATENTS

| | | | |
|---|---|---|---|
| 2,551,544 | 5/1951 | Nier et al. | 250—41.9 |
| 3,239,666 | 3/1966 | Newton et al. | 250—41.9 X |

WILLIAM F. LINDQUIST, Primary Examiner